US007040455B2

(12) United States Patent
Bogat

(10) Patent No.: US 7,040,455 B2
(45) Date of Patent: May 9, 2006

(54) SYSTEM AND METHOD FOR TRACKING ITEMS AT A SCALE OF A SELF-CHECKOUT TERMINAL

(75) Inventor: Antonio Bogat, Duluth, GA (US)

(73) Assignee: NCR Corporation, Dayton, OH (US)

( * ) Notice: Subject to any disclaimer, the term of this patent is extended or adjusted under 35 U.S.C. 154(b) by 203 days.

(21) Appl. No.: 09/949,777

(22) Filed: Sep. 10, 2001

(65) Prior Publication Data

US 2003/0047387 A1 Mar. 13, 2003

(51) Int. Cl.
*A63F 9/02* (2006.01)
(52) U.S. Cl. ................... 186/61; 186/59; 177/25.15; 177/25.19
(58) Field of Classification Search ............... 186/59, 186/61; 177/25.11–25.15, 25.18, 25.19, 177/26, 31, DIG. 2–DIG. 4, 199; 178/18.05; 235/383
See application file for complete search history.

(56) References Cited

U.S. PATENT DOCUMENTS

| 4,909,338 | A | * | 3/1990 | Vitunic et al. ................ 177/50 |
|---|---|---|---|---|
| 5,083,638 | A | * | 1/1992 | Schneider ..................... 186/61 |
| 5,115,888 | A | * | 5/1992 | Schneider ..................... 186/61 |
| 5,123,494 | A | * | 6/1992 | Schneider ..................... 177/50 |
| 5,125,465 | A | * | 6/1992 | Schneider ..................... 177/50 |
| 5,143,164 | A | * | 9/1992 | Nahar ........................... 177/50 |
| 5,210,706 | A | * | 5/1993 | Nishiyama .................... 702/41 |
| 5,671,362 | A | * | 9/1997 | Cowe et al. .................. 705/28 |
| 5,750,937 | A | * | 5/1998 | Johnson et al. ............ 177/25.11 |
| 5,805,467 | A | * | 9/1998 | Richards ..................... 702/101 |
| 6,069,696 | A | * | 5/2000 | McQueen et al. ........... 356/326 |
| 6,550,583 | B1 | * | 4/2003 | Brenhouse ................... 186/66 |
| 6,576,849 | B1 | * | 6/2003 | Bliss et al. ............... 177/25.13 |

* cited by examiner

*Primary Examiner*—Gene O. Crawford
*Assistant Examiner*—Jeffrey A. Shapiro
(74) *Attorney, Agent, or Firm*—Maginot, Moore & Beck LLP

(57) ABSTRACT

A system tracks items in the checkout area of a self-checkout terminal to reduce the likelihood of fraud in item substitution. The system includes a plurality of weight sensors operatively coupled to a checkout area for sensing a distributed weight of an item placed in a checkout area; and an item locator coupled to the plurality of weight sensors for determining a location for the item from the distributed weight as sensed by the sensors. The item locator identifies a location for an item from the weight differentials sensed at the weight sensors in response to movement of an item within the checkout area. The weight distribution and location data may be correlated to the item identifier for a scanned item so the items in the checkout area may be tracked. A security application program associated with the self-checkout terminal may be coupled to the system of the present invention to identify items placed on the checkout area by location as well as weight. As a consequence, the location of an item may be determined by the weight data detected by the sensors in response to an item being placed or removed in the checkout area. The location data for the items in the checkout area may be compared with stored location data for previously scanned items to determine whether another item has been substituted for a scanned item.

19 Claims, 3 Drawing Sheets

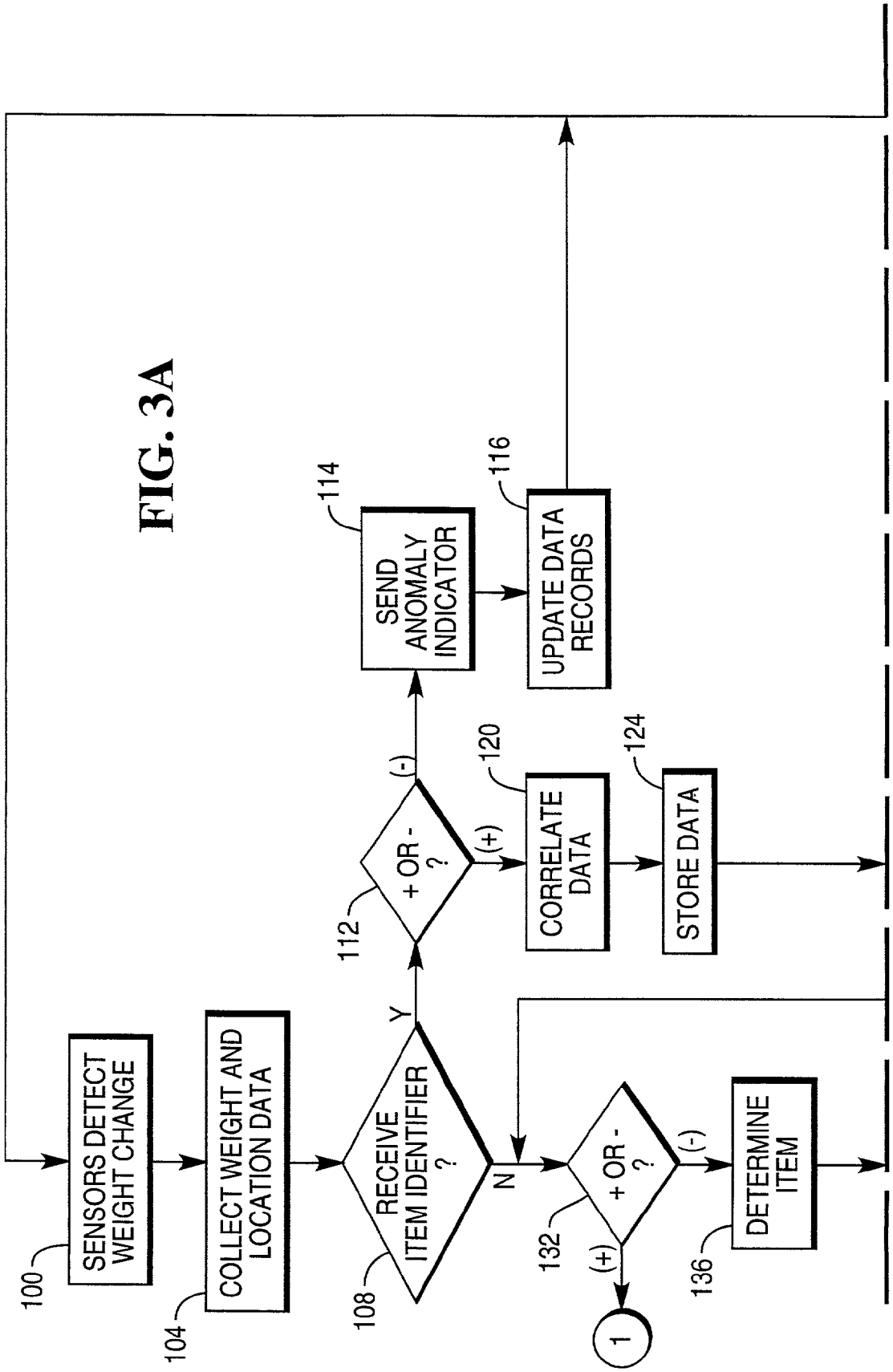

SYSTEM AND METHOD FOR TRACKING ITEMS AT A SCALE OF A SELF-CHECKOUT TERMINAL

FIELD OF THE INVENTION

This invention relates generally to methods and systems for facilitating transactions at a self-checkout terminal and, more particularly, to methods and systems for facilitating transaction at self-checkout terminals with scales.

BACKGROUND OF THE INVENTION

Self-checkout terminals at grocery stores and other retail stores are well known. The terminals permit a consumer to present items for purchase to sensors at the terminal so the terminal can identify the items and a corresponding price. When the consumer indicates all items for purchase have been presented to the terminal, a sub-total is accumulated, any taxes and discounts are computed, and a total amount due is displayed for the consumer. The terminal then allows the consumer to select a payment method. The terminal presents menu selections to the consumer so funds are transferred to the retailer's account. Upon confirmation of payment, the items are released to the consumer.

A self-checkout terminal typically includes a display, a scanner for reading unit price codes (UPC), and a checkout area for holding items once they have been scanned. The terminal also includes a processor, memory, programmed instructions, and data peripherals to control the operations of the terminal. The programmed instructions may contain modules for querying for item prices, computing totals and performing other functions related to the purchase of items through a self-checkout terminal. Some checkout terminals may also include a security application program that operates to reduce the likelihood that the consumer leaves without scanning all of the items or exchanges scanned items with more expensive items that have not been scanned. In many self-checkout terminals, the surface area of the checkout area has a scale underneath it to help track items during checkout. By monitoring the weight of items placed on the checkout area, the security application is able to determine some actions of the consumer for purposes of detecting fraud or operator error by a consumer. For example, the change in weight detected by the scales of the checkout area may be used to determine the weight of an item just placed on the checkout area. This item weight may then be compared to the weight of the item last scanned that is stored in a database or other memory. If the weights are different, the security application program notifies the consumer and prompts the consumer to remove the item and scan the item again to rectify the discrepancy. Thus, the application program is capable of tracking the scanning of items and their placement on the checkout area through its monitoring of the scales associated with the checkout area.

While this type of item monitoring is useful for security tracking purposes it does have some drawbacks. For one, items having the same weight as one or more items placed on the checkout area may be exchanged without detection by a security application that only monitors total weight at the checkout area. For example, one liter bottles of a beverage may be exchanged without detection because the security application would detect the removal of an item weighing the equivalent of a one liter bottle from the scale and the return of an item having the same weight. However, if the item returned to the scale was not a one liter bottle but one or more items having the same weight as the one liter bottle, the security program would not likely detect the exchange because the total weight before and after the exchange is the same.

In order to track the items in the checkout area in a more effective manner, the security program needs more data regarding the items for detection of exchanges.

What is needed is a method of tracking individual item characteristics in the checkout area rather than relying upon a single characteristic to which all of the items contribute.

SUMMARY OF THE INVENTION

The above-noted limitations of previously known systems and methods for tracking items in the checkout area of a self-checkout terminal have been overcome by a system and method that operate in accordance with the principles of the present invention.

The system of the present invention for tracking items in the checkout area of a self-checkout terminal comprises a plurality of weight sensors operatively coupled to a checkout area for sensing a distributed weight of an item placed in a checkout area and an item locator coupled to the plurality of sensors for determining a location for the item from the distributed weight as sensed by the sensors. Preferably, the sensors are comprised of four load cells located proximately at the corners of a rectangular scale area that comprises the checkout area. The location of the item placed in the checkout area may then be determined from the portion of the distributed weight sensed at each load cell because each load cell measures the weight of the item in direct proportion to the distance between the item and a load cell. The convergence of the distances from the load cells identifies a location for the item that may then be associated with the item in a memory storage unit. When an item is removed, the reduction in weight sensed by the sensors may be used to determine a location for the item prior to its removal. Thus, removed items may be identified and when another item is placed in the checkout area, a determination may be made by comparing to the total weight of the item to that of a previously removed item or a newly scanned item. By determining location and weight distribution data for an item, the checkout system of the present invention is better able than previously known checkout systems to track items placed in the checkout area.

Although the item locator as described above may be used to identify an item removed from a checkout area, the item locator may provide the location and weight distribution data to a security application executing in the checkout terminal for association with an item scanned. In such a system, the security application determines what item(s) have been moved or removed from the checkout area in response to updates from the item locator regarding weight changes detected by the weight sensors. Thus, the item locator may use the determined location and weight distribution data for item tracking or it may deliver the data to the security application so it may track items in the checkout area using such data.

The system of the present invention may be implemented with a self-checkout terminal that includes a display, a bar code scanner, and a checkout area with weight sensors, all of which are coupled to the terminal processor. The checkout area may include a processor with memory for collecting and analyzing weight and location data or it may provide the weight and location data to data peripheral interfaces for the terminal processor. The program memory of the terminal processor may include one or more program modules for determining an item's location and distributed weight data, identifying items moved in the checkout area, or providing item identifiers for correlation with weight and location data. The program memory may also include a security application that uses the item weight and location data to track items in the checkout area. The display may be used to communicate with the consumer regarding movement of items in the checkout area.

The method of the present invention includes sensing weight and location data at a plurality of points associated with a checkout area, and determining a location for an item using the distributed weight sensed at the points within the checkout area so movement of the item in the checkout area may be tracked. The item locations may be identified with two-dimensional coordinates. The method may also include sending the location and distributed weight data to a security application for tracking items in the checkout area. The method may also include detecting weight change and identifying an item corresponding to the location and the weight changes at the weight sensors. In response to detection of the weight change, the security application may prompt the consumer for information regarding movement of the item or it may wait for additional weight and location data to determine whether the item is returned to the checkout area.

It is an object of the present invention to provide a security application program for a self-checkout terminal with weight and item location data for items placed in the checkout area for the purpose of tracking items in the checkout area.

It is an object of the present invention to determine a location associated with an item that is placed in a checkout area and to associate the location with the change in weight data sensed at a plurality of weight sensors.

These and other advantages and features of the present invention may be discerned from reviewing the accompanying drawings and the detailed description of the invention.

BRIEF DESCRIPTION OF THE DRAWINGS

The present invention may take form in various system and method components and arrangement of system and method components. The drawings are only for purposes of illustrating an exemplary embodiment and are not to be construed as limiting the invention.

FIGS. 3A and 3B collectively show a flowchart of an exemplary method for tracking items in the checkout area of the system shown in FIG. 1.

DETAILED DESCRIPTION OF THE INVENTION

Figure 1:
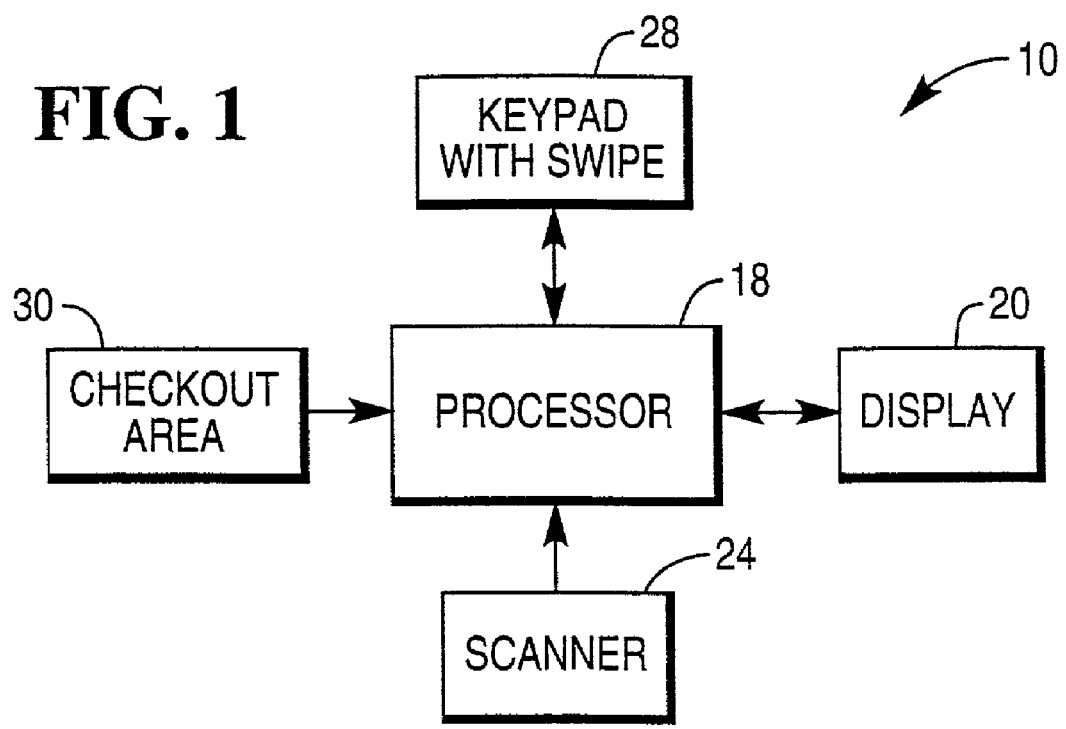
FIG. 1 depicts a block diagram of a self-checkout terminal in which the present invention may be used.

A system using one or more components of the present invention to track items placed in a checkout area of a self-checkout terminal is shown in FIG. 1. Self-checkout terminal 10 may include a holding area for holding items that a consumer plans to purchase through terminal 10. Operatively coupled to terminal processor 18 of terminal 10 are a display 20, a bar code scanner 24, a keypad with swipe reader 28, and a checkout area 30. A consumer typically scans the items so terminal processor 18 builds a list of items and computes a subtotal comprised of the cost of each item scanned. After each item is scanned it is placed on the surface of checkout area 30. A consumer may use keypad with swipe reader 28 to enter various data for discounts or payment options although processor 18 may accept such data through a touch screen associated with display 20. Also, a voice annunciator may be coupled to processor 18 to render vocal instructions to the consumer.

Figure 2:
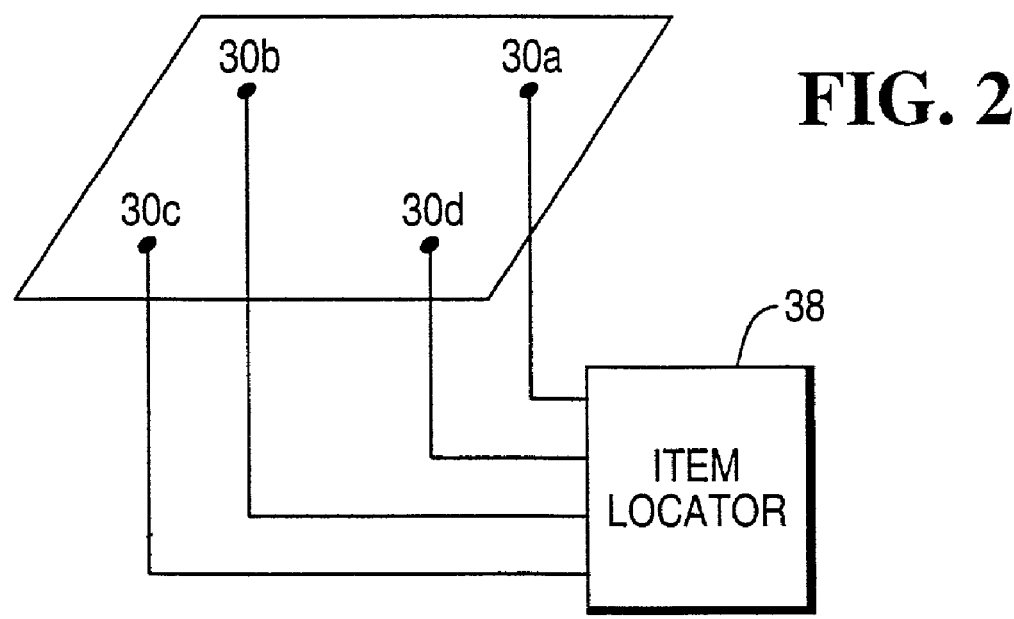
FIG. 2 is a block diagram of an exemplary embodiment of a checkout area coupled to the processor of the terminal shown in FIG. 1.

An exemplary embodiment of a checkout area made in accordance with the principles of the present invention is shown in FIG. 2. Checkout area 30A includes a plurality of weight sensors 34a–34d that are mounted proximately to the undersurface of checkout area 30A so that displacement of the surface of area 30A caused by items placed on its surface causes a sensor to sense a force and to measure a weight. Preferably, for a rectangular checkout area, the sensors are load cells, although known weight measuring sensors and transducers may be used. Also, other numbers and arrangement of weight sensors may be used to determine location data and weight distribution data for items placed in checkout area 30A without departing from the principles of the present invention. Each sensor is coupled to item locator 38 so an electrical signal corresponding to the force measured by a weight sensor may be provided to item locator 38. Item locator 38 may include a processor with memory having a program to operate item locator 38 as described below or locator 38 may be controlled by an application specific integrated circuit (ASIC). Item locator 38 is preferably coupled to processor 18 for communication with the security application program or any other module requiring item location and weight distribution data associated with items placed within checkout area 30A.

Item locator 38 detects changes in the signals generated by weight sensors 34a–34d. In response to a detected change, item locator obtains measurement data from weight sensors 34a–34d. The detected change in measurement data is the change in weight sensed from a steady state value previously established for a sensor. Preferably, a threshold value is identified to establish boundaries above and below the steady state value. The threshold value is selected to account for fluctuations in weight signals that may occur as a result of transient factors. A change in a weight signal that exceeds the threshold values established above and below a steady state value indicates movement of an item in checkout area 30A for which item locator 38 needs to determine a location and weight distribution. The new weight sensed at each sensor is compared to the previous steady state value for that sensor to determine a weight differential at the sensor. The weight differential at each sensor may be accumulated to determine a total weight for the item placed within checkout area 30A. This total weight for the item may be used by item locator 38 or the security application of terminal processor 18 to verify that the item placed in the checkout area is the last item scanned by bar code scanner 24.

Item locator 38 also uses the ratio of the weight sensed at a sensor to the total weight of an item to determine a location for the center of the item within the plane of the scale. For example, sensor 34A may detect a weight differential of 2 pounds while sensor 34B detects a weight differential of 4 pounds, sensor 34C a weight differential of 1 pound, and sensor 34D a weight differential of 3 pounds. From these measurements, item locator may determine that the total weight of the item is 10 pounds (2 lbs.+4 lbs.+1 lb.+3 lbs.). Item locator may also determine multiplying factors from the ratios (2/10, 4/10, 1/10, 3/10) that may be used with a dimension of the checkout area to determine a radius of location from the load cell location to the item. The intersection of the radii of location for the load cells may then be used to identify a location for the item. This location may be identified by Cartesian, polar coordinates, or the like and this location data may then be associated with the item identifier that may be stored in a memory unit associated with terminal processor 18, item locator 38, or both. Also the weight differentials for each of the load cells may be stored with the item identifier to facilitate identification of items removed from checkout area 30A as well. The new steady state values for the weight sensors may also be determined for the sensors so new thresholds are established for the weight sensors and monitoring of checkout area 30A for weight changes may continue. The new steady state value for a weight sensor may be a mean or median average of a plurality of readings taken from the sensor or a data window may be established for a sensor by a timer once a weight change exceeding a threshold is detected. In other words, the new weight value is the difference between the new steady state reading and the previously established value.

Item locator 38 may build a data structure comprised of an item identifier, item location data, the weight distribution data, and total weight. The data structure may be a relational database record or table, a data object, a linked list, a data array, or other known data structure or combination thereof. This data structure may then be sent to processor 18 for the purposes of tracking the movement of items in checkout area 30A. In such an embodiment, item locator 38 collects data so processor 18 may correlate to items that have been scanned during the current transaction. This embodiment is preferred in environments where the security application contains all of the logic for detecting item movement that requires interaction with the consumer.

In some environments, however, distribution of the item tracking function is preferred. To conform to this goal, processor 18 provides an item identifier to item locator 38 whenever a consumer scans a new item. If the weight differentials sensed at the sensors are positive, the location and weight distribution data are associated with the item identifier by item locator 38. The data structure containing these data may then be sent to the security application of processor 18 and/or stored within a memory associated with item locator 38. If the weight magnitude is negative, then receipt of an item identifier is incongruent with the detection of weight reduction at checkout area 30A. In response to this scenario, item locator 38 returns an anomaly code to the security application along with the correlated data structure and the item identifier received from processor 18. This data may be used by the security application to determine what action the consumer may have performed or to interact with the consumer to determine what actions the consumer may have performed.

If the weight magnitude is negative and no item identifier has been received from processor 18, then item locator 38 has detected the removal of an item from checkout area 30A. Using the negative weight differential data, item locator 38 may determine a location for the center of gravity of the removed weight within the plane of checkout area 30A and a total weight for the item. These two data values may be used to interrogate the stored data structures to identify the removed item and the weight differential data may be used to verify the identification of the removed item. If a subsequent weight change is detected at the same or different location that is the same weight as the previously detected removal and no new item has been scanned, item locator 38 may have detected the return of the removed item to checkout area 30A. Thus, a timeout period is preferably allowed to expire before data identifying item removal is sent to the security application. If data indicating the return of the item is detected during the timeout period, the item removal data need not be sent to the security application. If return of the item is detected, the data structure containing weight and location data for an item is updated to reflect the new location and the new weight differentials being sensed at the weight sensors. This updated data structure may also be provided to the security application for item tracking purposes. Should the timeout period expire before a weight is sensed that corresponds with the weight of the removed item, the data structure regarding the last know weight distribution and location data along with the item identifier is provided to the security application. If item locator 38 is unable to correlate the removed weight distribution and location data with one of the item identifier previously determined then a removal anomaly message is sent to the security application. The anomaly message includes the detected weight distribution and location data without an item identifier so the security application may process the data and interrogate the terminal user.

Figure 3B:
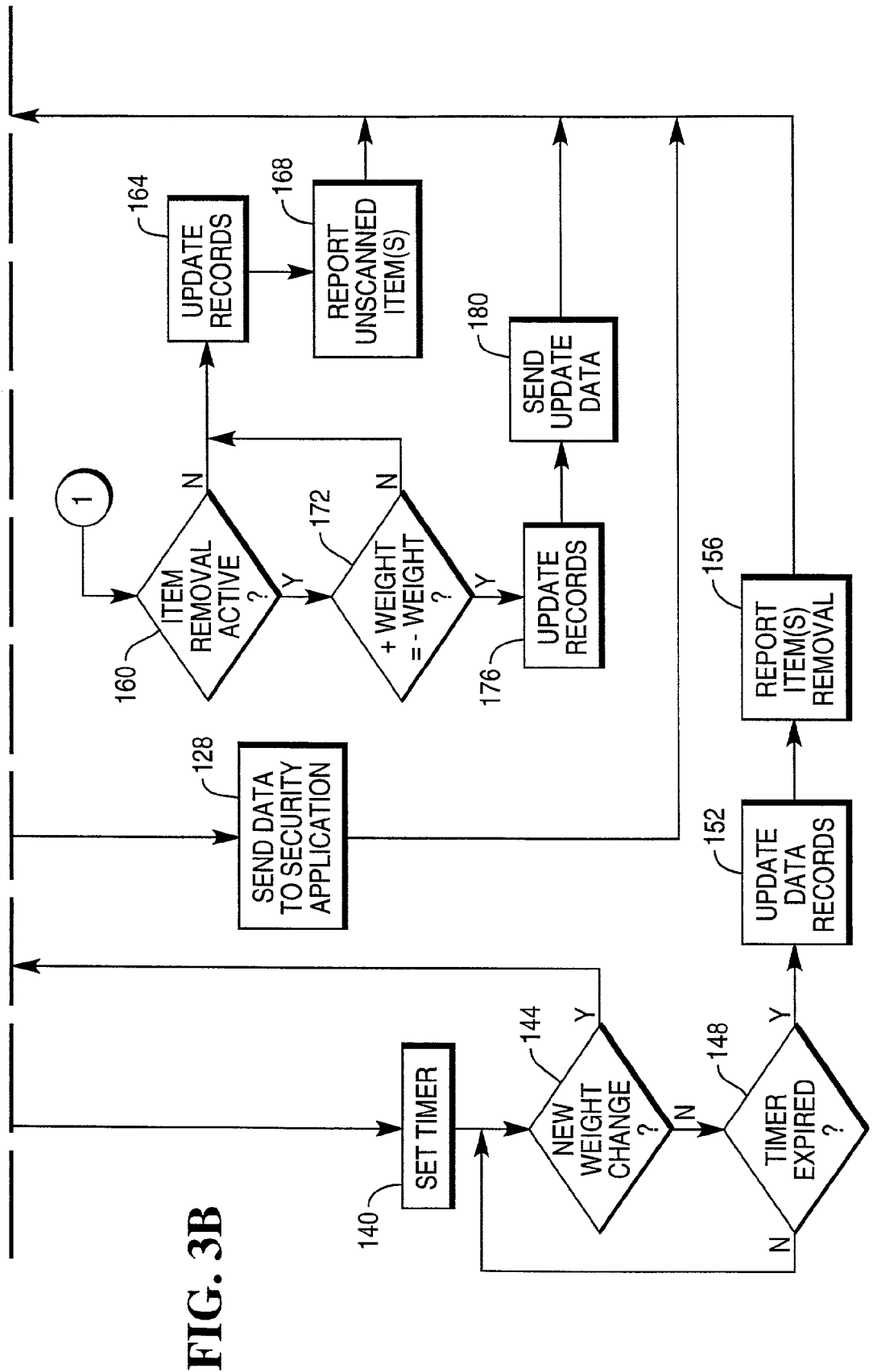

An exemplary method that conforms to the principles of the present invention is shown in FIGS. 3A and 3B. The process begins with a consumer bringing a group of items to a terminal 10 for purchase. The items are scanned with scanner 24 and processor 18 uses the scanned data to generate price and item data for display 20. After items are scanned, they are placed in checkout area 30A so the sensors 34a–34d sense the change in weight. When one or more of the sensors associated with checkout area 30A detect a weight change (block 100), item locator 38 collects the weight differential data and determines the location data for item causing the change in each sensor (block 104). As noted above, the weight differential data may be computed from previously established steady state values and the location data may be determined from ratios multiplied by checkout area dimensions. In its simplest form, item locator 38 sends the data structure containing the weight distribution and location data to the security application so the security application performs the processing for tracking items in checkout area 30A. However, the exemplary process shown in FIGS. 3A and 3B describes a process for an item locator that performs some of the item tracking that may be performed by the security application. Item locator 38, in such an exemplary embodiment, determines whether an item identifier has been received (block 108). If one has been received, the process determines whether the weight magnitude is positive or negative (block 112). If the weight magnitude is negative, an anomaly detection code is sent to the security application to advise the application that an item was removed when another item was scanned (block 114). The data record for the removed weight distribution and location is stored and a data record for the received item identifier without weight distribution and location data is generated and stored (block 116) and the process continues (block 100). This data may be sent to the security application for further processing. If the weight magnitude is positive and an item identifier was received, the item identifier is correlated to the weight distribution and location data (block 120). The resulting data structure is stored (block 124) and also sent to the security application (block 128).

If a weight change was detected and no item identifier received from processor 18, then the process determines whether the weight magnitude is positive or negative (block 132). If the weight magnitude is negative then an item has been removed. The process compares the location and weight data to the stored data records to determine the identity of the removed item (block 136). A timer is set (block 140) and the process waits to detect another weight change (block 144). If a weight change is not detected before the timer expires (block 148), then the data records are updated to reflect the removal of the item (block 152) and the removal is reported to the security application (block 156). If a weight change is detected, then the process determines whether the change is positive or negative (block 132). If it is negative then another item has been removed and the process continues to wait for the return of the removed items to the checkout area 30A (blocks 136–144). If they are not returned, then all of the removed items are reported to the security application (blocks 148–156). The detection of positive weight changes without receipt of an item identifier continues by determining whether an item removal is active (block 160). If it is not active, the placement of an item in checkout area 30A without scanning has been detected. The data records are updated to reflect the presence of the new item (block 164) and the location and weight data for the item that has not been scanned is reported to the security application (block 168). If a positive weight change is detected during an item removal state, the process compares the removed item weight to the new item weight (block 172). If they are not the same, the process updates its data records to reflect the presence of a new item (block 164) and reports the new item and removed item to the security application (block 168). If the weights are equal, the process updates its data records to reflect the new location of the removed item (block 176) and sends the data record to the security application so it may update its records regarding the item's location (block 180).

The system and method of the present invention may be implemented by adding functionality to an existing self-checkout terminal. That is, hardware and software may be added to the checkout area and processors, including the security application, of existing terminals to track items in the checkout area using the weight distribution and location data of the present invention. The system and method of the present invention provide a security application with more data regarding items moved in the checkout area of a self-checkout terminal so the security application may better track items and detect fraud.

While the present invention has been illustrated by the description of exemplary processes and system components, and while the various processes and components have been described in considerable detail, it is not the intention of the applicant to restrict or in any limit the scope of the appended claims to such detail. Additional advantages and modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A method of tracking items in a self-checkout terminal having a bar code scanner and a weight scale, comprising:
    scanning a first item with said bar code scanner so as to enter said first item into said self-checkout terminal;
    placing said first item on a product support platform of said weight scale after said scanning step;
    sensing a first distributed weight of said first item placed on said product support platform with a plurality of sensors and generating first distributed weight data in response thereto;
    generating first location data based on said first distributed weight data, said first location data being indicative of location on said product support platform of said first item;
    sensing a second distributed weight of a second item on said product support platform with said plurality of sensors and generating second distributed weight data in response thereto;
    generating second location data based on said second distributed weight data, said second location data being indicative of location on said product support platform from which said second item was removed; and
    in a case in which said second item has been removed from said product support platform, determining if said second location data and said first location data match.

2. The method of claim 1, further comprising interrogating a user of said self-checkout terminal if said second location data does not match said first location data.

3. The method of claim 1, further comprising correlating said first distributed weight data and said first location data to an item identifier so as to generate correlated item data.

4. The method of claim 3 further comprising:
    providing said correlated item data to a security application associated with a terminal processor; and
    using said correlated item data to track items in said self-checkout terminal.

5. The method of claim 1 further comprising:
    receiving an item identifier from a processor associated with said self-checkout terminal; and
    generating a data structure that correlates said item identifier with said first distributed weight data and said first location data.

6. The method of claim 5 wherein said data structure includes a total weight for said first item.

7. The method of claim 1 wherein said first location data is Cartesian coordinate data.

8. The method of claim 1 wherein said first location data is polar coordinate data.

9. A method of tracking items in a self-checkout terminal having a bar code scanner, a weight scale, and a memory, comprising:
    sensing a distributed weight of an item on said product support platform with a plurality of sensors and generating distributed weight data in response thereto;
    generating location data based on said distributed weight data, said location data being indicative of location on said product support platform from which said item was removed; and
    in a case in which said item has been removed from said product support platform, comparing said location data to other location data stored in said memory, said other location data being indicative of location of items positioned on said product support platform that have been previously scanned in said self-checkout terminal with said bar code scanner.

10. The method of claim 9, further comprising interrogating a user of said self-checkout terminal if said location data of said item does not match any of said other location data stored in said memory.

11. The method of claim 9 wherein said location data is Cartesian coordinate data.

12. The method of claim 9 wherein said location data is polar coordinate data.

13. A method of tracking items in a self-checkout terminal having a bar code scanner and a weight scale, comprising:
    scanning an item with said bar code scanner so as to enter said item into said self-checkout terminal;
    placing said item on a product support platform of said weight scale after said scanning step;

sensing a distributed weight of said item placed on said product support platform with a plurality of sensors and generating distributed weight data in response thereto;

generating location data based on said distributed weight data, said location data being indicative of location on said product support platform of said item; and using said location data to detect movement of said item within said self-service checkout terminal.

14. The method of claim 13, further comprising correlating said distributed weight data and said location data to an item identifier so as to generate correlated item data.

15. The method of claim 14 further comprising:

providing said correlated item data to a security application associated with a terminal processor; and using said correlated item data to track said item in said self-checkout terminal.

16. The method of claim 13 further comprising:

receiving an item identifier from a processor associated with said self-checkout terminal; and generating a data structure that correlates said item identifier with said distributed weight data and said location data.

17. The method of claim 16 wherein said data structure includes a total weight for said item.

18. The method of claim 13 wherein said location data is Cartesian coordinate data.

19. The method of claim 13 wherein said location data is polar coordinate data.

* * * * *